United States Patent [19]
Macon, Jr. et al.

[11] Patent Number: 5,353,410
[45] Date of Patent: Oct. 4, 1994

[54] METHOD AND SYSTEM FOR DEFERRED READ IN LAZY-WRITE DISK CACHE SYSTEMS

[75] Inventors: James F. Macon, Jr., Boynton Beach, Fla.; Shauchi Ong, Pleasantville, N.Y.; Feng-Hsien Shih, Hsien, Taiwan

[73] Assignee: International Business Machines Corporation, Armonk, N.Y.

[21] Appl. No.: 853,219

[22] Filed: Mar. 18, 1992

[51] Int. Cl.$^5$ .............................................. G06F 13/00
[52] U.S. Cl. ..................................... 395/275; 395/425
[58] Field of Search ........................ 395/275, 250, 425

[56] References Cited
U.S. PATENT DOCUMENTS
4,916,605  4/1990  Beardsley ............................ 395/425

*Primary Examiner*—Robert L. Richardson
*Attorney, Agent, or Firm*—Bruce D. Jobse; Andrew J. Dillon

[57] ABSTRACT

Lazy Write disk cache systems are often utilized in disk cache designs. In such systems, data to be written to the disk storage system is temporarily placed in cache memory for a preselected period of time until an actual update of the disk occurs. By deferring disk write operations input/output performance efficiency is enhanced. However, in sector-based disk storage systems in which data may only be read from or written to a disk in predetermined fixed amounts an attempted update of data often requires a read of data from the disk storage system to ensure that existing data is not written over during an update. The method and system of the present invention avoids this problem by maintaining a status table for each block of cache memory which includes an identification of each byte within each block of cache memory which will be updated. A required read from the disk storage system is then deferred until an update takes place, or eliminated entirely if all bytes within a cache memory block have been updated.

8 Claims, 4 Drawing Sheets

METHOD AND SYSTEM FOR DEFERRED READ IN LAZY-WRITE DISK CACHE SYSTEMS

BACKGROUND OF THE INVENTION

1. Technical Field

The present invention relates in general to improved data processing systems and in particular to methods and systems for improved efficiency in data updating within a data processing system. Still more particularly, the present invention relates to improvements in the efficiency of disk storage system input-output performance.

2. Description of the Related Art

Data processing systems are well known in the art. Data stored within such data processing system is typically stored either within solid state memory devices such as Random-Access-Memory or within magnetic media, such as tape or disk storage systems. In the design of a data processing system the system designer must constantly trade off speed of access and cost when considering the maintaining of data within storage. For example, integrated circuit memory chips are increasingly less expensive; however, the cost of maintaining a particular amount of memory in integrated circuit memory chips is substantially greater than the cost for a similar amount of memory in a tape or disk storage system. However, access times for data stored within a tape or disk storage system are substantially greater than access times for data which is stored within Random-Access-Memory. Thus, modern system designers have often attempted to minimize the number of disk storage input/output operations which must take place during the processing of a particular application in order to maintain application speed at the highest possible level.

One technique known in the prior art for increasing the efficiency of an application is the so-called "Lazy Write" strategy, which is widely used in many disk cache designs. The Lazy Write strategy involves placing data to be written to the disk storage system in a memory cache for a defined period of time before the actual updating of the data on the physical disk block occurs. By postponing disk write operations, these operations are not performed in the time-critical path and the performance of the data processing system utilizing such a strategy is greatly enhanced over the write through strategy which requires at least one immediate disk access for each write request.

While the Lazy Write strategy greatly enhances the efficiency of input/output performance of disk storage systems in data processing systems it is not entirely efficient in sector-based disk systems. In such systems, disk granularity requires that only a fixed size data block may be read from or written to each disk during an input/output operation. These systems do not enjoy all of the efficiency of a Lazy Write cache write strategy in that an attempt to write less than the minimum data block of data to the disk requires that the non-updated data from the disk be read into cache memory before the execution of a write operation. This requirement is due to the fact that an attempt to write the minimum size data block to the disk system will overwrite any non-updated data within the data block. Several common cases in which this occurs are situations in which an application attempts a partial write, that is, a write of less than the fixed size data block permitted by disk system granularity or write which is less than the granularity permitted by the Lazy Write strategy in the writing to a disk system. The effectiveness and performance of the Lazy Write operation is therefore significantly degraded, due to the requirement for additional read requests in such sector-based disk systems.

It should therefore be obvious that a need exists for a method and system whereby input/output performance may be enhanced for sector-based disk storage systems within a data processing system.

SUMMARY OF THE INVENTION

It is therefore one object of the present invention to provide an improved data processing system.

It is another object of the present invention to provide an improved method and system for enhancing the efficiency of data updating within a data processing system.

It is yet another object of the present invention to provide an improved method and system for enhancing the efficiency of disk storage system input/output performance.

The foregoing objects are achieved as is now described. Lazy Write disk cache systems are often utilized in disk cache designs. In such systems, data to be written to the disk storage system is temporarily placed in cache memory for a preselected period of time until an actual update of the disk occurs. By deferring disk write operations input/output performance efficiency is enhanced. However, in sector-based disk storage systems in which data may only be read from or written to a disk in predetermined fixed amounts an attempted update of data often requires a read of data from the disk storage system to ensure that existing data is not written over during an update. The method and system of the present invention avoids this problem by maintaining a status table for each block of cache memory which includes an identification of each byte within each block of cache memory which will be updated. A required read from the disk storage system is then deferred until an update takes place, or eliminated entirely if all bytes within a cache memory block have been updated.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
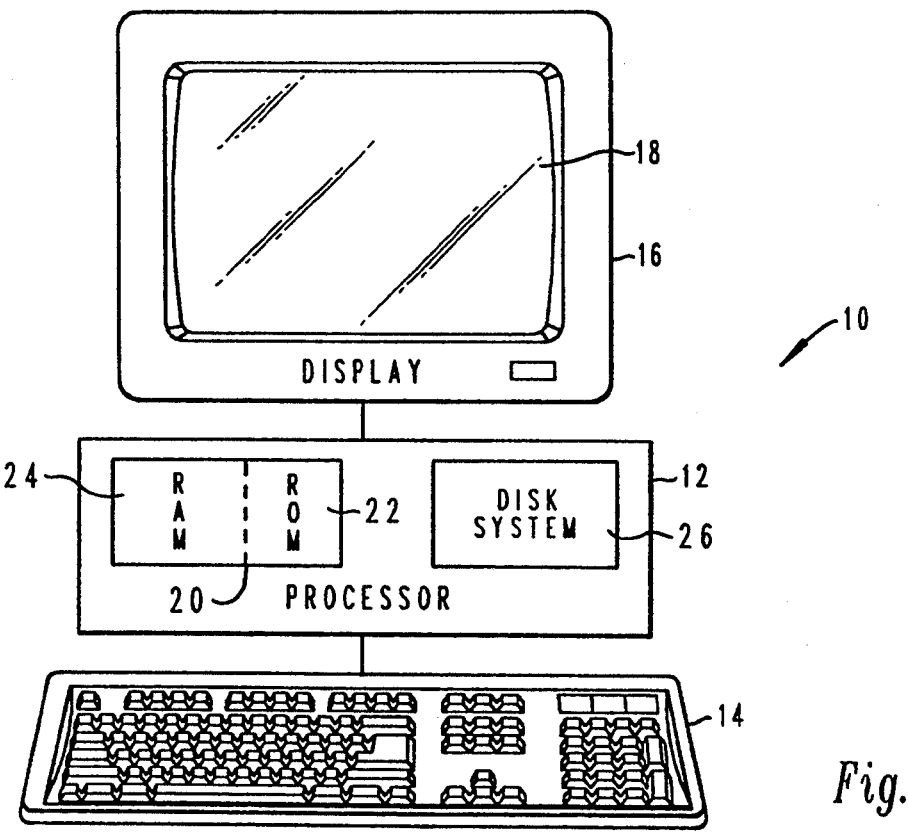
FIG. 1 is a partially schematic, pictorial representation of a data processing system which may be utilized to implement the method and system of the present invention.

With reference now to the figures and in particular with reference to FIG. 1, there is depicted a partially schematic pictorial representation of a data processing system 10 which may be utilized to implement the method and system of the present invention. Those skilled in the art will appreciate that data processing system 10 may be implemented utilizing any so-called "personal computer" such as the International Business Machines Corporation PS/2 Personal Computer. As illustrated, data processing system 10 preferably includes a processor 12 coupled to a keyboard 14 and a display device 16. Display device 16 is preferably utilized to provide a display screen 18 in a manner well known in the art. Processor 12 preferably includes, among other components, system memory 20 which may be composed of Random Access Memory (RAM) 24 and Read Only Memory (ROM) 22. Additionally, processor 12 preferably includes a disk storage system 26 which may include both diskette drives and fixed disk storage systems.

As discused above, the performance of data processing system 10 may be significantly degraded by excessive read and write requests to disk storage system 26, despite the speed and processing capacity of processor 12. Disk storage systems are generally the slowest component within a data processing system and the efficiency of application processing is often enhanced by a strategy which minimizes the read and write access of a disk storage system. The so-called "Lazy Write" cache write strategy has been utilized for some time to enhance the efficiency of disk cache designs by placing write data in a cache memory for a defined period of time prior to the actual update of the physical disk. Since disk write operations are postponed and not performed in the time-critical path, the cache write strategy is known to provide enhanced performance for data processing systems. However, as discussed above, sector-based disk systems suffer significant degradation as a result of additional read requests which are necessitated by the minimum data block size for read and write operations in such systems. It is therefore an object of the present invention to enhance the efficiency of disk storage system input/output performance in such sector-based disk systems.

Figure 2:
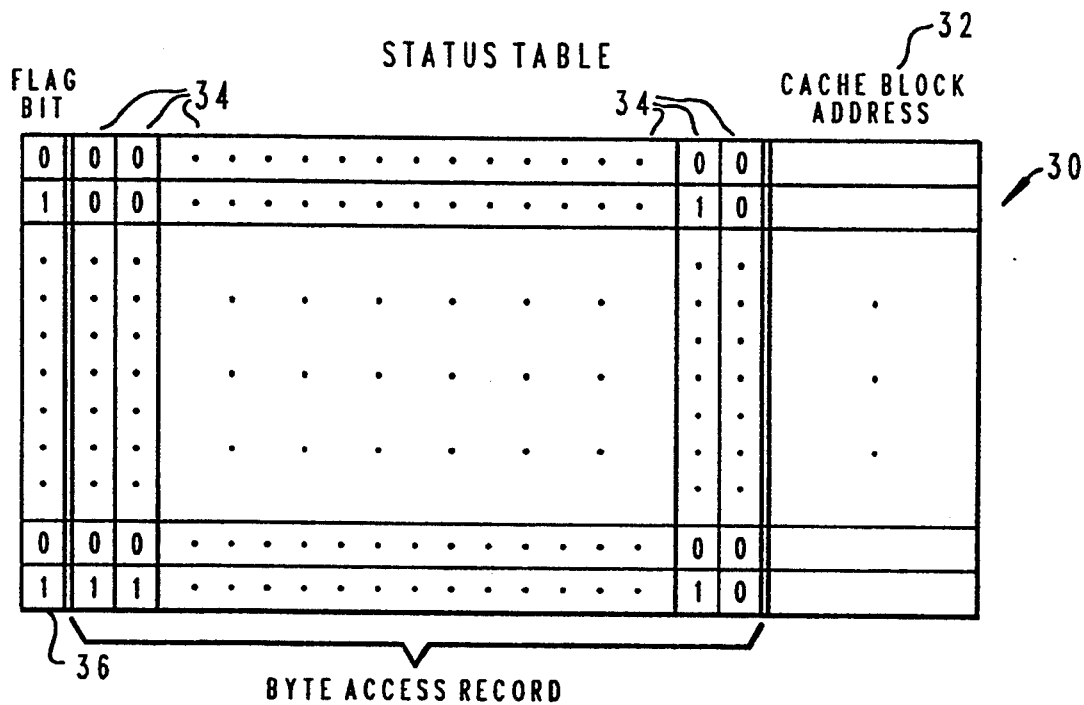
FIG. 2 is a pictorial representation of a cache block status table which may be utilized to implement the method and system of the present invention.

With reference now to FIG. 2, there is depicted a pictorial representation of a cache block status table 30 which may be utilized to implement the method and system of the present invention. As illustrated, status table 30 preferably includes a plurality of rows and columns, including column 32 which identifies the address for each cache block within a cache memory system. A plurality of columns 34 are also provided, preferably one column for each byte of data within each cache block. For example, if each cache block includes 512 bytes of data, then 512 byte access record columns 34 are provided within status table 30. Finally, a flag bit column 36 is also provided.

As will be explained in greater detail herein, each byte within a cache block has a byte access record column 34 associated therewith within status table 30. Each byte access record column 34 preferably includes a single bit, either a "1" or a "0," which indicates the write status of the byte associated with that bit within each cache block. In the depicted embodiment of the present invention, a "1" indicates that the byte associated with that bit within byte access record column 34 has been modified and a "0" indicates that the associated byte within the cache block is unmodified.

Thus, when a partial write request is executed by a data processing system 10 for a number of bytes within a cache block, the bit within an associated byte access record column within status table 30 is altered to a "1," indicating that the bytes in question have been updated. In a manner which will be explained in greater detail herein, the reading of the remaining bytes within each cache block may then be deferred, rather than issuing an immediate read request to the disk storage system, greatly enhancing the efficiency of the disk storage system input/output operations.

Flag bit column 36 is also maintained within status table 30 and preferably includes either a "1" or a "0" which is utilized to indicate whether or not every byte within an associated cache block has been updated. As those skilled in the art will appreciate, if each byte within a particular cache block has been updated, by one or more write operations, the entire cache block may be written to the disk storage system without the necessity for a read request, since no existing data remains within the disk storage system sector associated with that cache block which will not be overwritten by updated data.

Figure 3:
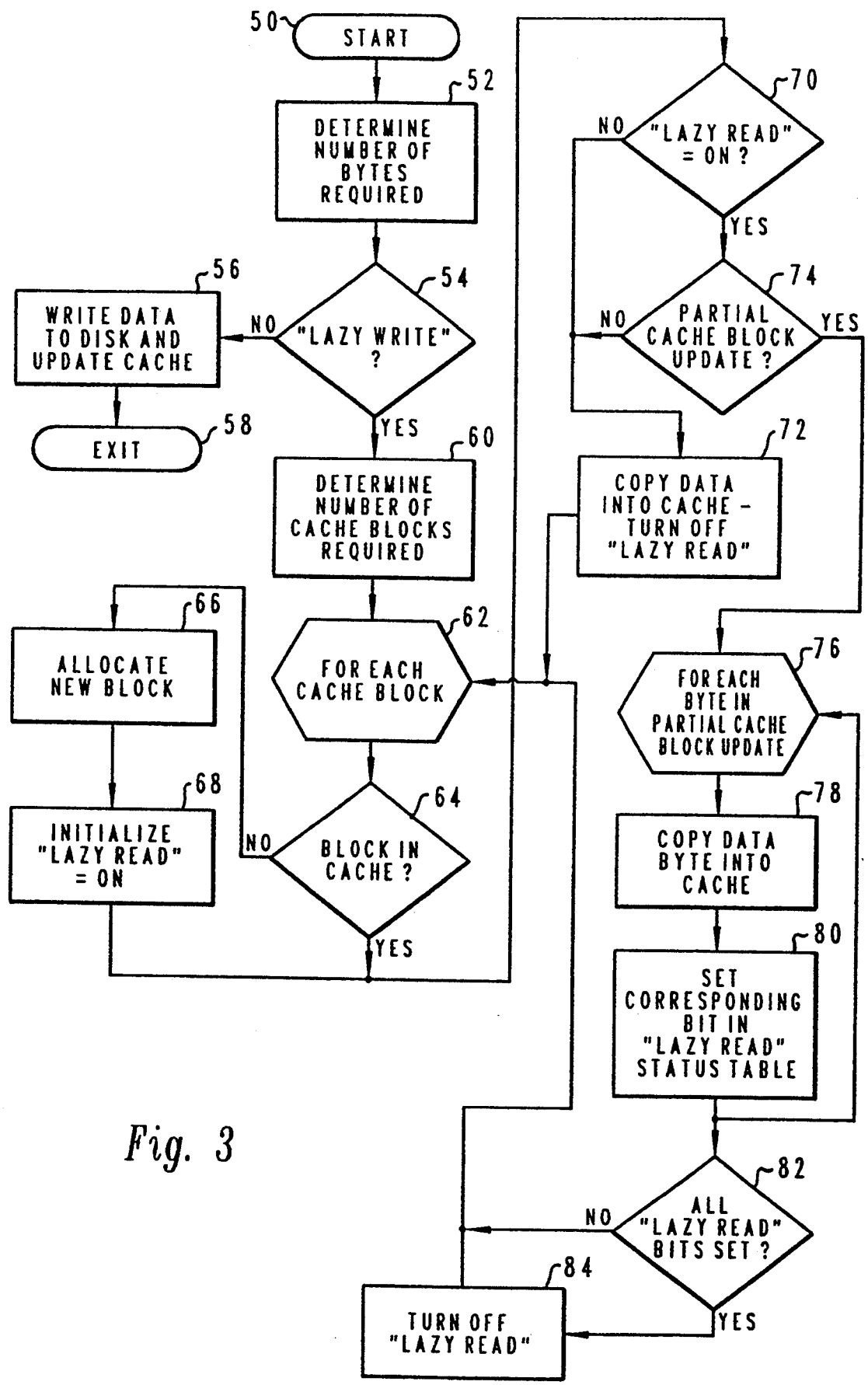
FIG. 3 is a high level logic flowchart illustrating the writing of data into a cache memory for deferred updating of data in a disk storage system in accordance wit the method and system of the present invention.

With reference now to FIG. 3, there is depicted high level logic flowchart which illustrates the writing of data into a cache memory for deferred updating of data in a disk storage system. As illustrated, the process begins at block 50 and thereafter passes to block 52. Block 52 depicts a determination of the number of bytes of memory which are required for the write request being processed and the process then passes to block 54. Block 54 illustrates a determination of whether or not the Lazy Write cache strategy is in effect and if not, the process merely passes to block 56 which depicts the writing of data to the disk and the updating of the cache memory. Thereafter, the process passes to block 58 and exits.

Referring again to block 54, in the event the Lazy Write cache strategy is in effect, the process passes to block 60. Block 60 illustrates the determination of the number of cache blocks which will be required for the write operation and the process then passes to block 62. Block 62 illustrates a repetitive routine for each cache block within the number which will be required for the write operation. This routine begins at block 64 which illustrates a determination of whether or not the cache block in question is currently within the cache. If not, the process passes to block 66.

Block 66 illustrates the allocation of a new block for utilization by the cache and block 68 then depicts the initialization of the "Lazy Read" flag, within column 36 of status table 30, to the "on" state, indicating that a read request must be executed at some time in the future.

Thereafter, after either initializing the "Lazy Read" flag for the cache block in question or, after determining that the block in question is already within the cache, the process passes to block 70. Block 70 illustrates a determination of whether or not the "Lazy Read" flag within column 36 of status table 30 (see FIG. 2) is "on." If not, this means that the data within the entire cache block is valid and a subsequent read request is not necessary. This may occur as a result of the writing of all new data into every byte within the cache block or as a result of multiple write operations into the cache block which results in each byte therein being updated.

In the event the "Lazy Read" flag for the cache block in question is not "on," the process passes to block 72. Block 72 illustrates the copying of the data into the cache and the turning off of the "Lazy Read" flag. The process then returns to block 62 to repeat the previously described process for each block within the cache memory.

Referring again to block 70, in the event the "Lazy Read" flag is on, indicating that a subsequent read operation will be required, the process passes to block 74. Block 74 illustrates a determination of whether or not the data being updated is a partial cache block and if not, the process again passes to block 72, copying the data into the cache, since an entire cache block will have been updated.

Referring back to block 74, in the event the update which has occurred is a partial cache block update, the process passes to block 76. Block 76 illustrates a repetitive process which will be followed for each byte within a partial cache block update. This process begins at block 78, which illustrates the copying of a data byte into the cache. Thereafter, the corresponding bit within status table 30 (see FIG. 2) which corresponds to this byte within the cache memory block in question is set, indicating that updated data has been written to a selected byte within the cache block memory. Thereafter, the process returns to block 76 until such time as each byte within the partial cache block update has been copied into the cache and had its corresponding bit within status table 30 set.

The process then passes to block 82, which illustrates a determination of whether or not all of the "Lazy Read" bits within status table 30 have been set and if not, the process passes returns to block 62 to repeat that operation for each subsequent cache block. However, in the event all "Lazy Read" bits have been set, the process passes to block 84, which turns off the "Lazy Read" flag, indicating that all bytes within the cache block in question have been updated (no read request will be required) and the process again returns to block 62.

Figure 4:
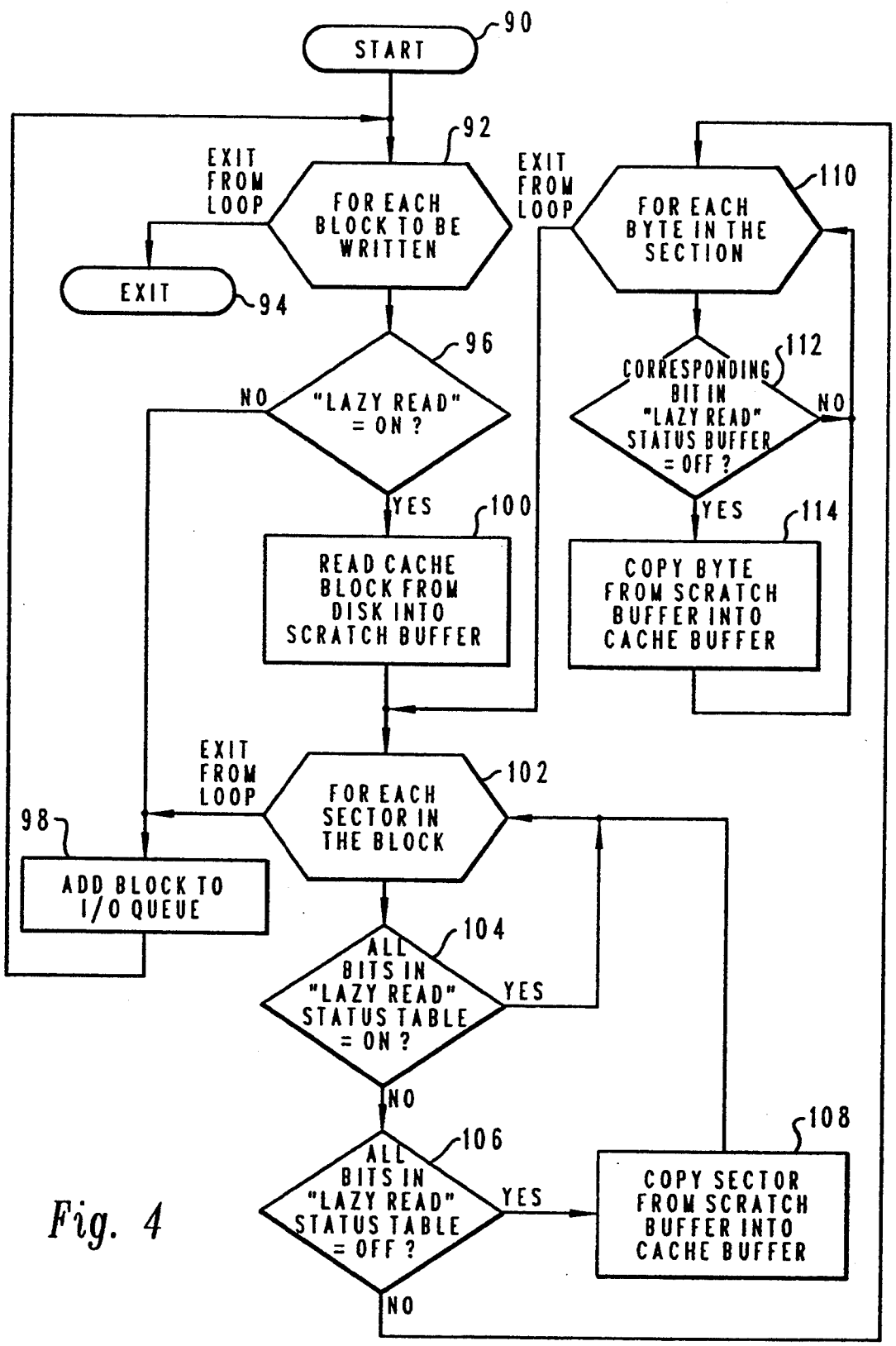
FIG. 4 is a high level flowchart illustrating the updating of data in a disk storage system in accordance with the method and system of the present invention.

Referring now to FIG. 4, there is depicted a high level logic flowchart illustrating the updating of data in a disk storage system in accordance with the method and system of the present invention. As illustrated, the process begins at block 90 and thereafter passes to block 92. Block 92 illustrates an iterative process to be followed for each block to be written to the disk storage system utilizing the method and system of the present invention. After each block has been written, the process exits from the loop and then exits, as illustrated at block 94.

Referring again to block 92, for each block to be written to the disk storage system in accordance with the method and system of the present invention, the process passes to block 96. Block 86 illustrates a determination of whether or not the "Lazy Read" flag within flag bit column 36 of status table 30 is "on." In the event the "Lazy Read" flag is not "on," indicating that each byte within the cache block has been updated, the process passes to block 98 which illustrates the adding of the cache block in question to the input/output queue for writing to the disk storage system. The process then returns iteratively to block 92.

In the event the "Lazy Read" flag is "on," the process passes to block 100. Block 100 illustrates the reading of the data within the cache block from the disk storage system into a scratch buffer. Those skilled in the art will appreciate that, as described above, this step is necessary in order to obtain that data which was not updated by the write operation so that the existing and updated data may be written back to the disk storage system without overwriting existing unchanged data. Thereafter, the process passes to block 102.

Block 102 illustrates an iterative process which will occur for each sector within the block. Firstly, a determination is made as to whether or not all bits within the "Lazy Read" status table are "on," indicating that each byte within that block has been updated. If so, the process returns to block 102 to analyze a subsequent sector within the block.

In the event all of the bits within the "Lazy Read" status table are not "on" the process passes to block 106. Block 106 illustrates a determination of whether or not all bits within the "Lazy Read" status table are "off." In the event all bits within the "Lazy Read" status table are off, the process passes to block 108 which illustrates the copying of the sector data from the scratch buffer into the cache buffer.

Referring again to block 106, in the event all bits within the "Lazy Read" status table are not "off" the process passes to block 110. Block 110 illustrates an iterative process which will occur for each byte in the sector. Firstly, as illustrated at block 112, a determination is made as to whether or not a bit within a byte access record column 34, which corresponds to a particular byte within the sector is "off," indicating that the data within that byte has not been modified. In the event the data within a corresponding byte has been modified, the process passes to block 114 which illustrates the copying of the byte from the scratch buffer into the cache buffer. Thereafter, or in the event the corresponding bit within the "Lazy Read" status buffer is not "off," the process returns to block 110 to continue to iteratively analyze each byte within the sector.

Thus, upon reference to the foregoing those skilled in the art will appreciate that the Applicants have provided a novel method and system whereby an immediate read request which results from a partial write, as discussed above, may be deferred until a later time by storing an indication within status table 30 (see FIG. 2) of the update status of each individual byte within each cache block memory, so that a read from the disk storage system of unmodified data may be deferred until a subsequent time. Additionally, in the event multiple partial write operations occur which effectively update each byte within a single cache block, the read from the disk storage system may be completely eliminated. The performance of a "Lazy Write" disk cache strategy may then be greatly enhanced in a sector-based disk storage system, such as the type described herein.

Figure 5:
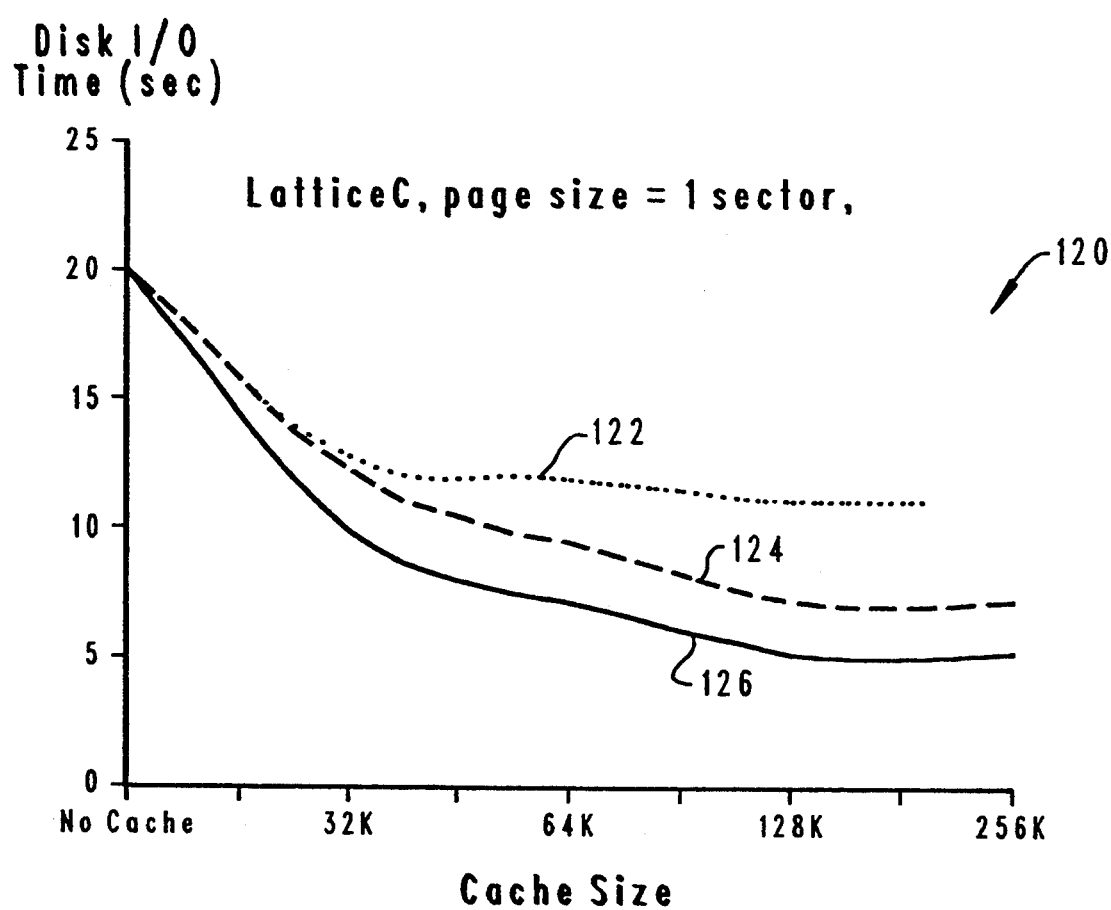
FIG. 5 is a graphic depiction of the increase in efficiency of disk storage input/output performance which may be accomplished utilizing the method and system of the present invention.

With reference now to FIG. 5, there is depicted a graphic depiction of the increase in efficiency of disk storage input/output performance which may be accomplished utilizing the method and system of the present invention. This figure compares performance simulation results of the method and system of the present invention with both write-through and ordinary "Lazy Write" caching in a DOS C Compiler application. As illustrated, the vertical axis graphs the amount of disk input/output time required in seconds and the horizontal axis depicts variations in the cache size provided.

The curve depicted at reference numeral 122 illustrates the amount of disk input/output time required for a write-through system while the curve at reference numeral 124 depicts the amount of disk input/output time required for a traditional "Lazy Write" caching system. Finally, the curve illustrated at reference numeral 126 depicts the amount of disk input/output time required for a "Lazy Read-Lazy Write" system implemented in accordance with the method and system of the present invention. As illustrated, the amount of disk input/output time is substantially decreased when utilizing the method and system of the present invention.

While the invention has been particularly shown and described with reference to a preferred embodiment, it will be understood by those skilled in the art that various changes in form and detail may be made therein without departing from the spirit and scope of the invention.

We claim:

1. A method in a computer system for improving the efficiency of disk storage input/output performance in a sector-based disk storage system, said method comprising the steps of:
   temporarily writing new data to be stored within said disk storage system within selected bytes in one or more cache memory blocks, each cache memory block associated with at least one sector of said disk storage system;
   recording within an associated status table an indication of the writing of each byte of new data within each cache memory block;
   deferring the writing of said new data within said one or more cache memory blocks into said disk storage system until a subsequent time; and
   at said subsequent time reading from said disk storage system existing data within each sector associated with a cache memory block having new data written therein prior to writing said new data into said disk storage system, wherein data within a sector of said disk storage system may be updated.

2. The method in a computer system for improving the efficiency of disk storage input/output performance in a sector-based disk storage system according to claim 1, further including the step of recording within said associated status table an indication of whether or not new data is written into every byte of a selected cache memory block.

3. The method in a computer system for improving the efficiency of disk storage input/output performance in a sector-based disk storage system according to claim 2, wherein said step of reading from said disk storage system existing data within each sector associated with a cache memory block having new data written therein further comprises the step of reading from said disk storage system existing data within each sector associated with a cache memory block for only those cache memory blocks having new data written into less than every byte therein.

4. A data processing system for improving the efficiency of disk storage input/output performance, said data processing system comprising:
   a sector-based disk storage system;
   memory means;
   means for temporarily writing new data to be stored within said disk storage system within selected bytes in one or more cache memory blocks within said memory means, each cache memory block associated with at least one sector of said disk storage system;
   a status table associated with said one or more cache memory blocks;
   means for recording an indication of the writing of each byte of new data within each cache memory block within said status table;
   means for writing said new data within said one or more cache memory blocks into said disk storage system at a selected subsequent time; and
   means for reading from said disk storage system existing data within each sector associated with a cache memory block having new data written therein at said selected subsequent time and prior to writing said new data into said disk storage system wherein data within a sector of said disk storage system may be updated.

5. The data processing system for improving the efficiency of disk storage input/output performance according to claim 4, wherein said memory means comprises random access memory.

6. The data processing system for improving the efficiency of disk storage input/output performance according to claim 4, wherein said status table associated with said one or more cache memory blocks comprises one row associated with each cache memory block and a plurality of columns, each associated with a single byte within a cache memory block.

7. The data processing system for improving the efficiency of disk storage input/output performance according to claim 4, wherein said status table associated with said one or more cache memory blocks further includes an indication of whether or not new data is written into every byte of each cache memory block.

8. The data processing system for improving the efficiency of disk storage input/output performance according to claim 7, wherein said means for reading from said disk storage system existing data within each sector associated with a cache memory block having new data written therein further comprises means for reading from said disk storage system existing data within each sector associated with a cache memory block for only those cache memory blocks having new data written into less than every byte therein.

* * * * *